March 10, 1970  N. F. HECTOR  3,499,299
FLEXIBLE UNIVERSAL JOINT
Filed April 8, 1968

United States Patent Office 3,499,299
Patented Mar. 10, 1970

3,499,299
FLEXIBLE UNIVERSAL JOINT
Nils Folke Hector, 13 Bjorkvagen, Solna, Sweden
Filed Apr. 8, 1968, Ser. No. 719,344
Claims priority, application Sweden, Apr. 7, 1967,
4,870/67
Int. Cl. F16d 3/66
U.S. Cl. 64—15                            2 Claims

ABSTRACT OF THE DISCLOSURE

A universal joint comprising two substantially axially aligned shaft members, a rigid intermediate connecting member which is located between end surfaces of the shaft members and extending in the axial direction of the shaft members, and two pairs of leaf springs extending in the axial direction with the planes of the springs extending radially and with the springs of each pair lying diametrically opposite each other. The plane of the springs of each pair is common to the springs of the pair and is perpendicular to the plane of the springs of the other pair. The springs of one pair has one end connected to one of the shaft members and the opposite end connected to the intermediate connecting member and, similarly, the leaf springs of the second pair has one end connected to the other one of said shaft members and the opposite end connected to the intermediate connecting member. The connecting member is located centrally of the innermost edges of all said leaf springs and constitutes a central, elongated body of the joint.

FIELD OF THE INVENTION

The present invention relates to a universal joint which connects two rotatable shafts such that rotating movement and driving torques required for the driving can be transmitted from one shaft to the second shaft at the same time as it allows the shafts during the rotation to make small flexible motions relative to each other. Such universal joints are used within many fields, for example, in turbine constructions and in the gyro art (free gyroscopes) were the problem is to arrange a rotor upon a shaft such that the rotor can be driven from the shaft but at the same time such that the rotor has a certain degree of freedom to change its angular position relative to the driving shaft.

DESCRIPTION OF PRIOR ART

In previously known constructions where rotating shafts are imparted with bending motions and where it is required that rotating shafts be imparted with angular deflections respectively, the problems are normally solved for example by means of conventional cardan joints or slender shafts. The cardan joint built up by common bearings is rigid for the rotating motion and can be dimensioned for large torsional torques but has the essential drawback, especially in gyro applications, that the bearings introduce a non-linear frictional torque in respect of bending motions about axes in a plane perpendicular to the rotation axis. The support by means of slender shafts, for example achieved by turning down a section of a shaft, has the drawback that it will be weak also for torsional torques and cannot be dimensioned for transmission of large torques if it is required to make it weak for bending motions.

A universal joint according to the invention is of the type known from U.S. Patent No. 2,966,049, for instance, consisting of a rigid intermediate portion having an extension in the direction of the rotation axis, which portion is connected with two rotatable shafts through two pairs of radially arranged leaf springs extending in the direction of the rotation axis with the springs in each pair lying diametrically opposite each other, the plane of the springs of one pair being common to the springs of the pair and lying perpendicular to the springs of the other pair for allowing bending about two mutually perpendicular axes in the said plane, said leaf springs in each pair having one end connected to the respective rotatable shaft and the opposite end connected to the intermediate portion at an attachment point lying beyond the bending axis as measured from the respective shaft.

SUMMARY OF THE INVENTION

The primary object of the invention is to provide a universal joint of the leaf spring type which fulfills high requirements as regards a true transmission of shaft movements and at the same time large requirements upon low friction and freedom from play and which has extremely small dimensions.

A further object of the invention is to provide a universal joint that can be manufactured from a single shaft piece as a unitary one-piece structure.

A further object of the invention is to achieve, in a universal joint of the kind described, a well defined bearing point represented by the bending centrum of the leaf springs, to which end the springs may be shaped with a varying sectional area with the smallest dimension at the middle and increasing dimensions in the direction of the spring ends.

In a preferred embodiment according to the invention the universal joint constitutes a one-piece structure made from one single piece, for example a solid shaft of circular sectional area, and comprises four radial recesses regularly distributed around the periphery of the member, said recesses leaving a central body forming the intermediate connecting member, the leaf springs constituting partition walls between the said recesses, and being separated from the intermediate connecting member at one end and from the adjacent shaft portion at the other.

BRIEF DESCRIPTION OF THE DRAWING

The invention is illustrated in the accompanying drawings in which.

DESCRIPTION OF THE PREFERRED EMBODIMENTS

Figure 1:
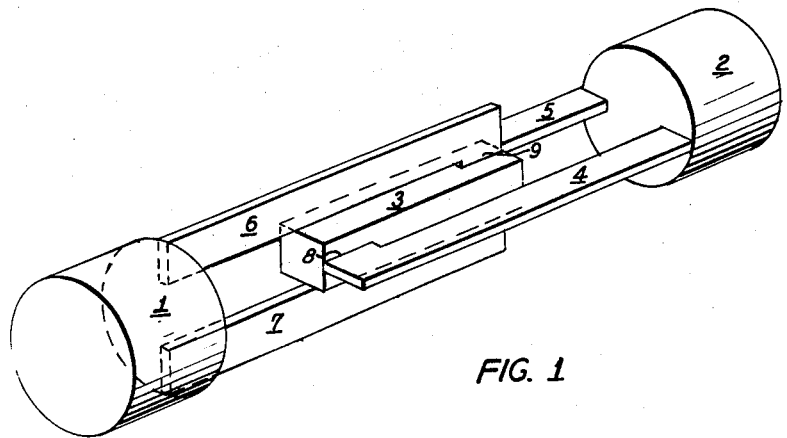
FIG. 1 is a schematic perspective view illustrating a universal joint according to the invention.

In FIG. 1 the shafts to be interconnected through the universal joint are designated 1 and 2. The universal joint consists of a rigid intermediate piece 3 and two pairs of leaf springs 4, 5 and 6, 7 respectively. The springs 4, 5 forming one of said pairs join the intermediate piece with shaft 2, while the springs 6, 7 forming the second pair join the intermediate piece 3 and shaft 1. The points of attachment at the intermediate piece 3 are, for both pairs, situated at that end of the intermediate piece, which is directed away from the respective shaft, as shown at 8 for the spring 4 and at 9 for the spring 6. The two pairs of springs will then allow bending of the shafts relative to the intermediate piece about mutually perpendicular axes lying in the plane of the respective spring pair.

When driving one of the shafts about the axis of shaft 1, a torsional torque will be transmitted from one shaft to the other via the leaf springs, which are then imparted with a combined stress comprising torsion, bending and shearing. As shown more closely in the following, the springs can be shaped such that the universal joint will be practically rigid for torsional motions, but in spite of this, weak in bending motions about the bending axes.

It is to be observed that for illustrational purposes the springs, as illustrated in FIG. 1, extend axially a larger distance than corresponding to practical conditions, due to the fact that the bending axes of the two spring pairs do not coincide according to the drawing. In reality the shape and dimensions of the springs must be such that this requirement is fulfilled. FIG. 1 merely is intended to illustrate the general principle of the universal joint according to the invention only and is not intended to give directions for a practical realization of the invention.

Figures 2, 3, 4:
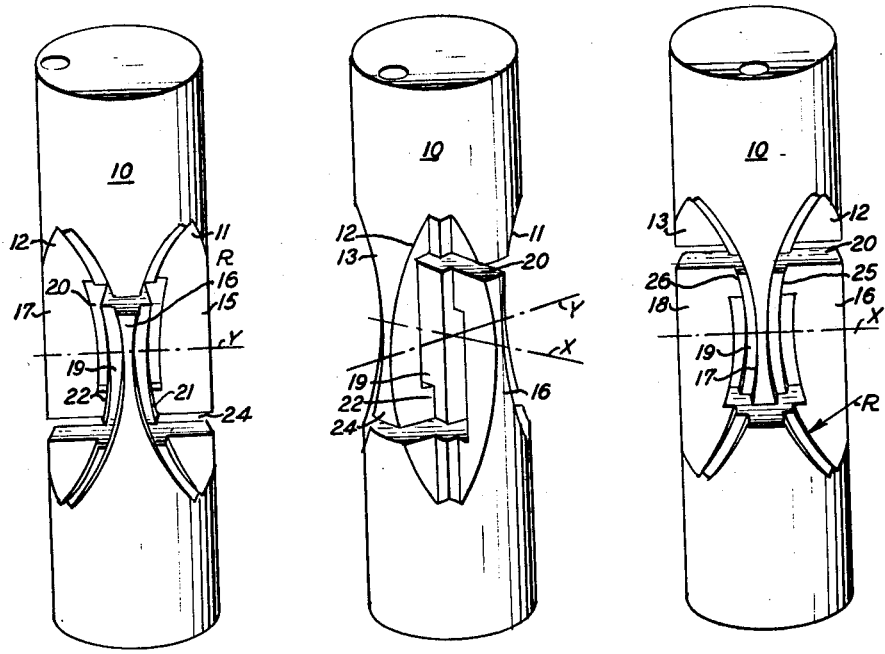
FIGS. 2–4 show a preferred embodiment of the universal joint in three different angular positions.

An embodiment of the universal joint according to the invention is shown in FIG. 2 which refers to a universal joint made by the machining of one single piece 10 having a circular sectional area. In a first working step four mutually perpendicular radial recesses of which recesses 11, 12 and 13 are shown, are made by milling along a section of the shaft 10. The recesses have such a width in the circumferential direction that between the recesses there only remain small leaf-shaped portions 15, 16, 17, 18. As a result of milling these leaf-shaped portions with a radius, the portions will have a varying sectional area with the smallest thickness at the center and increasing in thickness in direction to the ends. The recesses are further made such that in the center of the shaft 10 remains a piece 19 forming a central core a square sectional area. Also the sectional dimensions of the core will vary with the smallest area at the center and increasing area towards the ends, the thickness of the core being, however, at all places larger than the thickness of the leaf-shaped portions.

For completing the universal joint, cuttings are made in a second working step along two horseshoe or U-shaped cutting lines for separating the spring shaped portions from the core and also separating the core from the respective shaft piece. The cutting tracks generally follow the connection line between the central core portion and two opposite leaf spring-shaped portions and runs at one end transversally across the central portion so that both the core and the remaining opposite leaf-shaped portions are separated from the adjacent shaft piece. One cutting track 20 thus separates the central core portion and the leaf springs 16, 18 from the upper shaft piece as viewed in the drawing and furthermore separates the leaf spring 15, 17 from the central core piece, except for portions of attachment 21, 22 where the leaf springs 15, 17 are integral with the core piece. The second cutting track 24 separates the core piece and spring leaves 15, 17 from the lower shaft and separates furthermore the core piece from the leaf springs 16, 18, except for portions of attachment 25, 26 where the leaf springs are still integral with the core portion.

The device manufactured in this way forms a universal joint in which the central core portion forms a substantially rigid intermediate piece and the opposite leaf springs form a pair of springs connecting the intermediate piece with the respective shaft piece.

The universal joint according to the invention can be modified in several aspects within the scope of the invention. Thus the radial recesses may have any shape adapted to the required shape of the leaf springs. The universal joint may also, in principle, be produced from several pieces shaped in a suitable way and attached to each other by welding or the like.

I claim:

1. A universal joint comprising, in combination, two substantially axially aligned shaft members, a rigid connecting member which is located between end surfaces of said substantially aligned shaft members and extends in the axial direction of said shaft members, and two pairs of leaf springs extending in said axial direction with the planes of the springs extending radially and with the springs of each pair lying diametrically opposite each other, the plane of the springs of one pair being common to the springs of the pair and being perpendicular to the plane of the springs of the other pair, the leaf springs of one pair having one end connected to one of said shaft members and the opposite end connected to said intermediate connecting member and the leaf springs of the second pair having one end connected to the other one of said shaft members and the opposite end connected to the intermediate connecting member, said connecting member being located centrally of the innermost edges of all said leaf springs.

2. universal joint as claimed in claim 1, constituting a one-piece structure made from one single piece and comprising four radial recesses regularly distributed around the periphery of the member, said recesses leaving a central body forming the intermediate connecting member, the leaf springs constituting partition walls between the said recesses, and being separated from the intermediate connecting member at one end and from the adjacent shaft portion at the other.

References Cited

UNITED STATES PATENTS

| 2,475,010 | 7/1949 | Chilton | 64—15 X |
| 2,860,495 | 11/1958 | Stark | 64—15 X |
| 3,393,535 | 7/1968 | Morin | 64—11 |

FRED C. MATTERN, Jr, Primary Examiner